(12) United States Patent
Lancefield et al.

(10) Patent No.: US 7,444,968 B2
(45) Date of Patent: Nov. 4, 2008

(54) VARIABLE PHASE DRIVE COUPLING

(75) Inventors: Timothy Mark Lancefield, Shipston on Stour (GB); Ian Methley, Witney (GB)

(73) Assignee: Mechadyne PLC, Kirtlington (GB)

( * ) Notice: Subject to any disclaimer, the term of this patent is extended or adjusted under 35 U.S.C. 154(b) by 28 days.

(21) Appl. No.: 11/550,886

(22) Filed: Oct. 19, 2006

(65) Prior Publication Data

US 2007/0119402 A1 May 31, 2007

(30) Foreign Application Priority Data

Nov. 28, 2005 (GB) ................................. 0524159.1

(51) Int. Cl.
*F01L 1/34* (2006.01)

(52) U.S. Cl. .................. 123/90.17; 123/90.15; 464/160

(58) Field of Classification Search .............. 123/90.15, 123/90.16, 90.17, 90.18, 90.12, 90.13; 464/1, 464/2, 160
See application file for complete search history.

(56) References Cited

U.S. PATENT DOCUMENTS

| 5,002,023 | A  * | 3/1991 | Butterfield et al. | ....... 123/90.15 |
| 6,725,817 | B2 * | 4/2004 | Methley et al.     | ......... 123/90.17 |
| 7,000,580 | B1 * | 2/2006 | Smith et al.       | ............. 123/90.17 |

* cited by examiner

*Primary Examiner*—Ching Chang
(74) *Attorney, Agent, or Firm*—Smith-Hill and Bedell

(57) ABSTRACT

A variable phase drive coupling is described for providing drive from an engine crankshaft to two sets of cams. The drive coupling comprising a drive member 12 connectable for rotation with the engine crankshaft and two driven members 18, 20 each connectable with a respective one of the two sets of cams. In the invention, the angular relationship of each of the driven members 18, 20 is independently variable relative to the drive member 12 under the action of camshaft torque reversals.

9 Claims, 6 Drawing Sheets

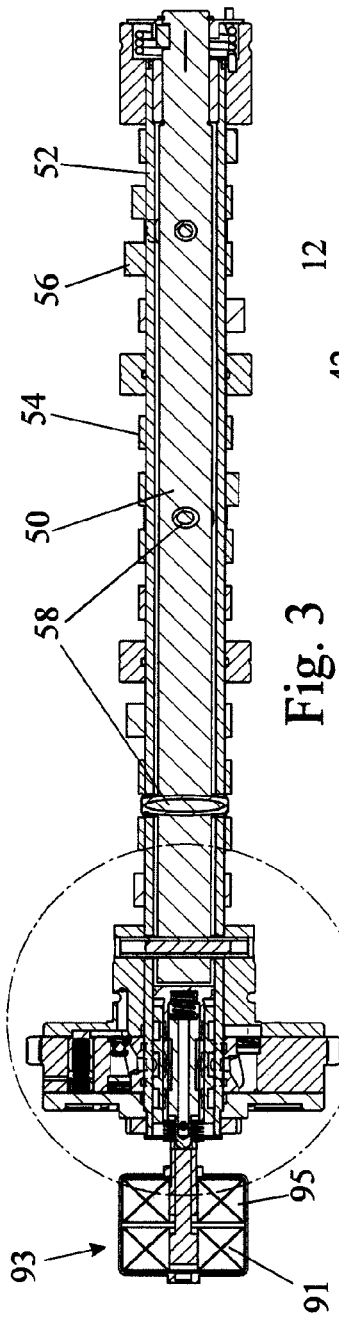
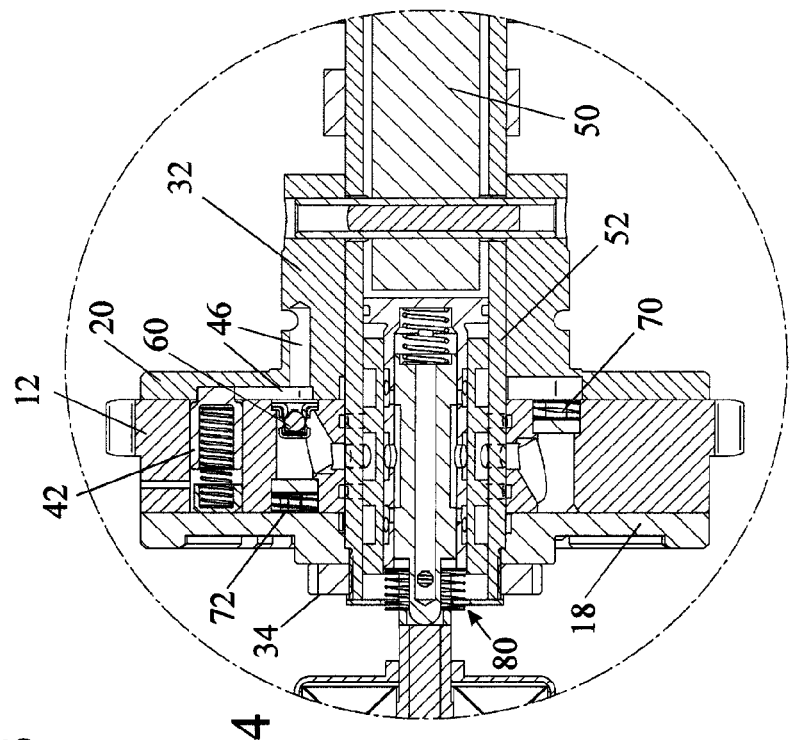
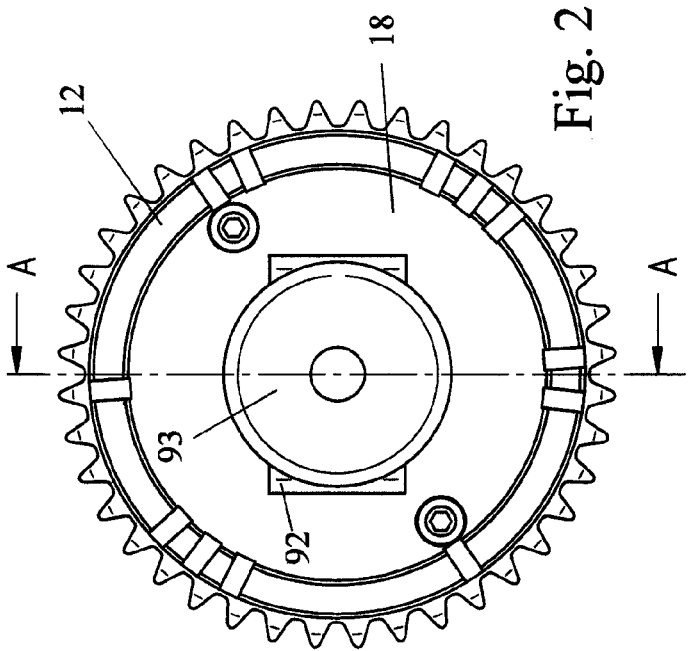
Fig. 3
Fig. 4
Fig. 2

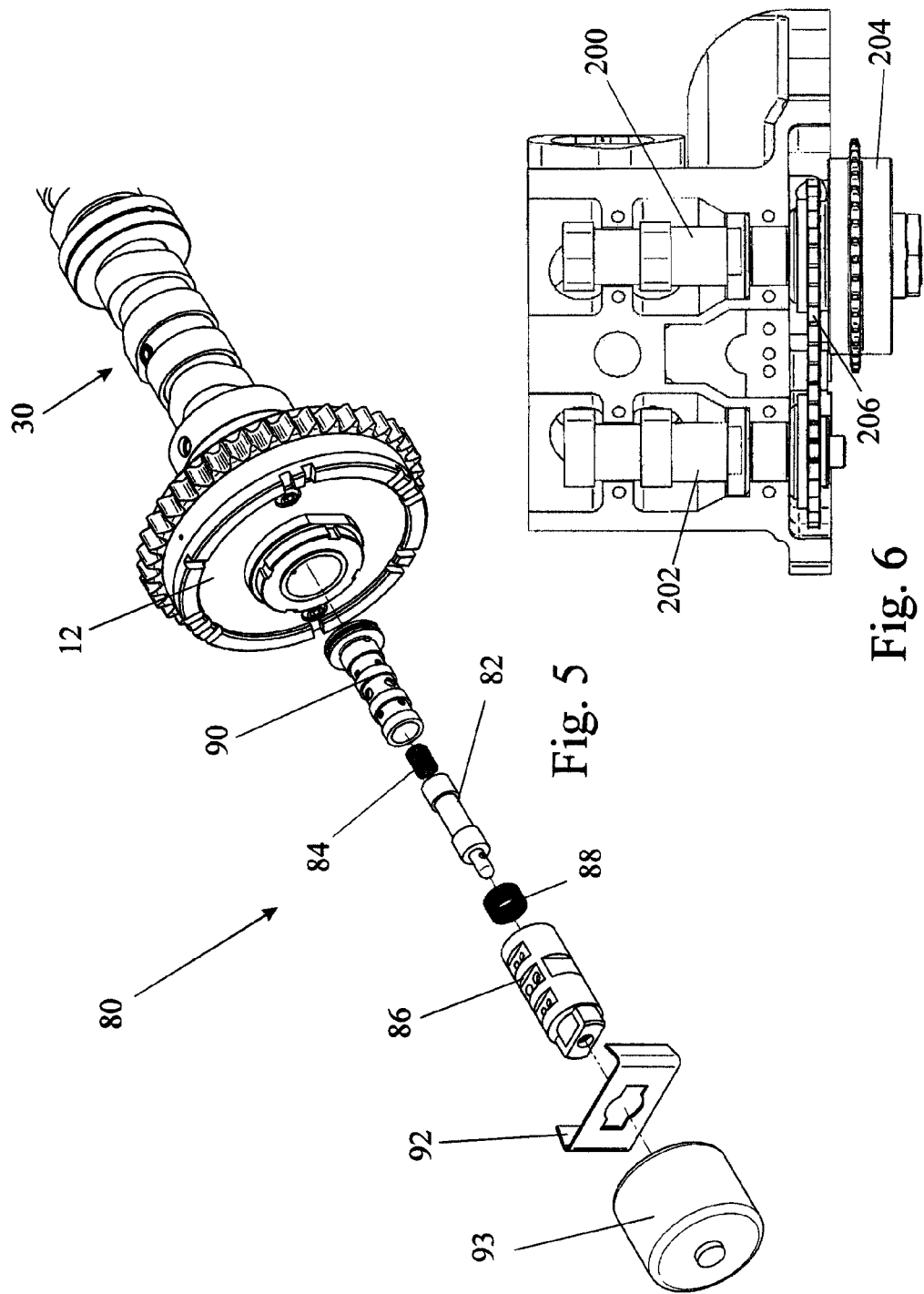

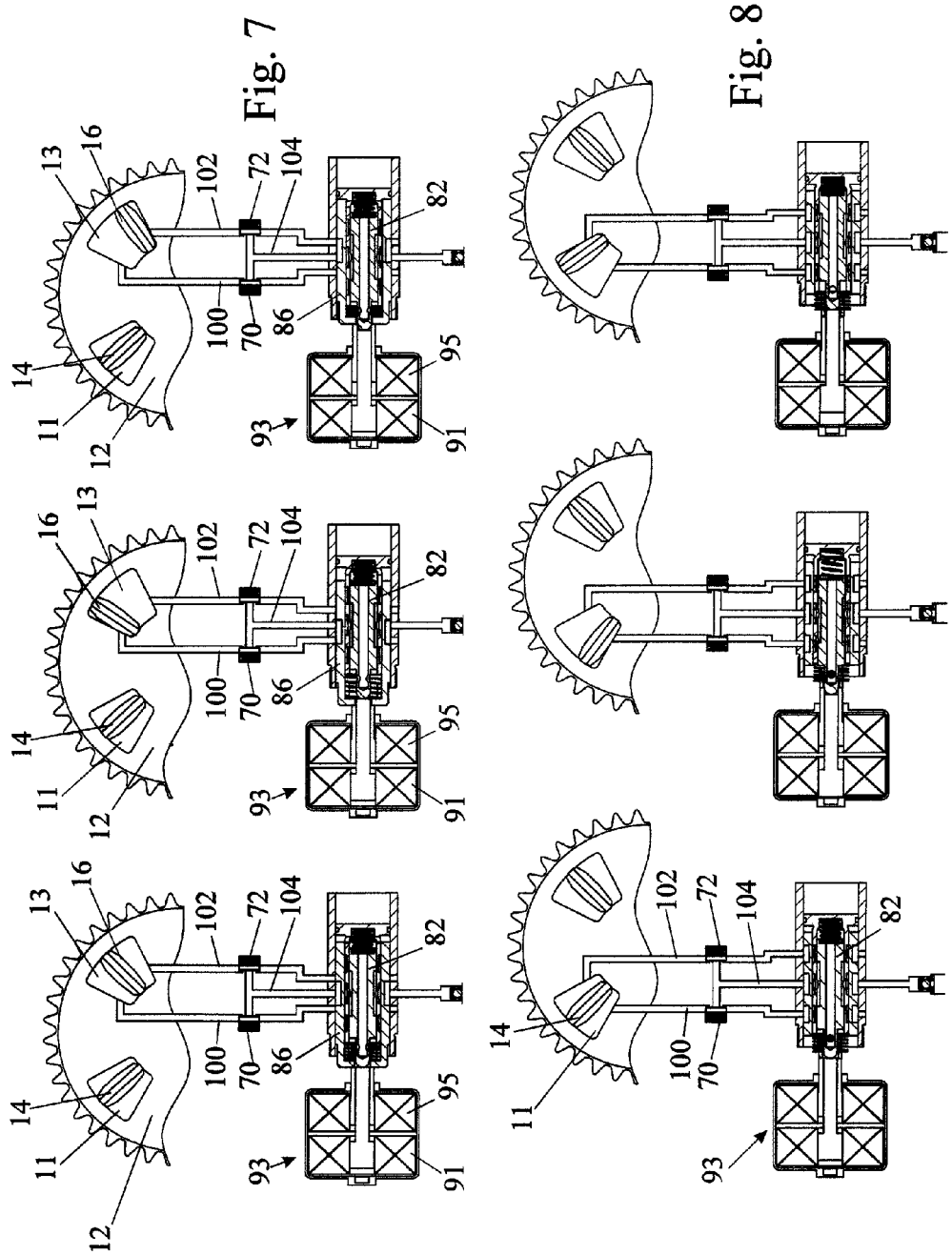

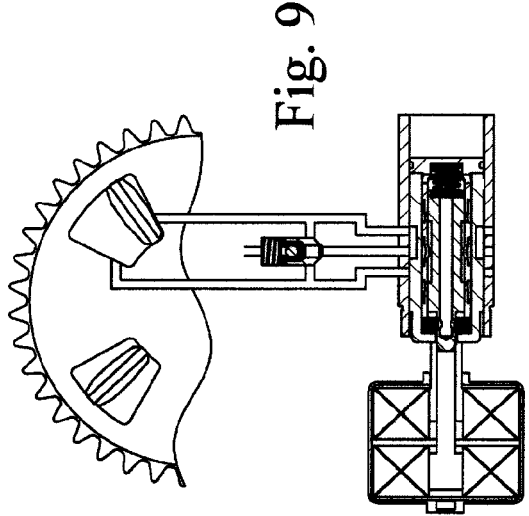
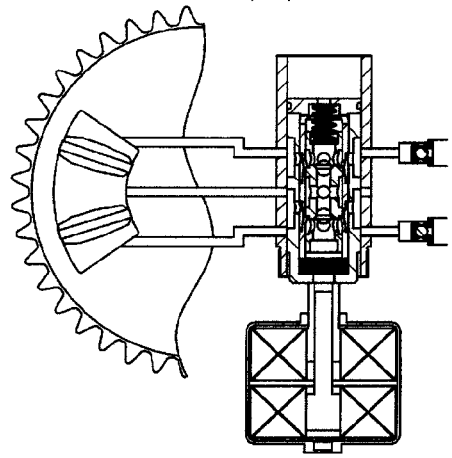
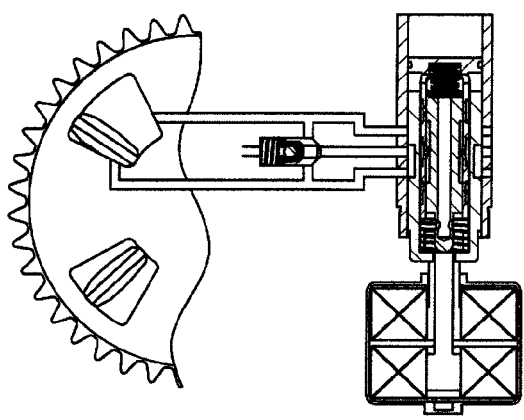
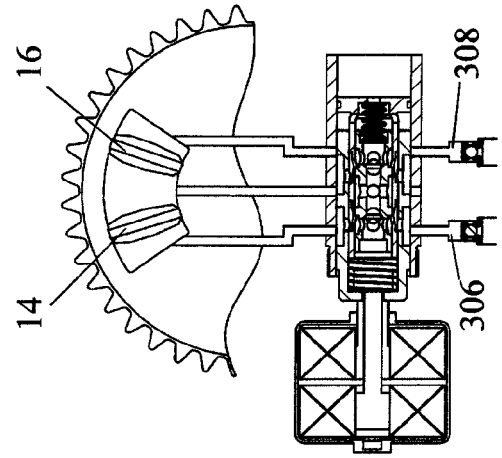
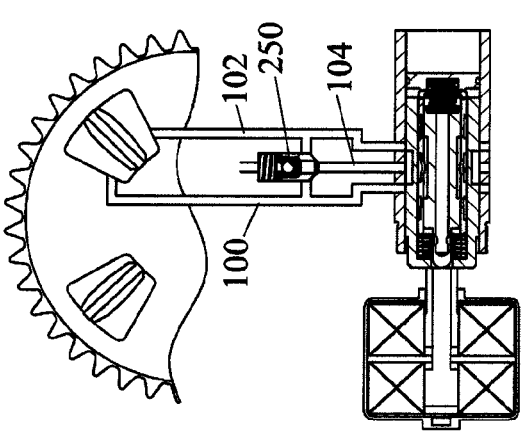
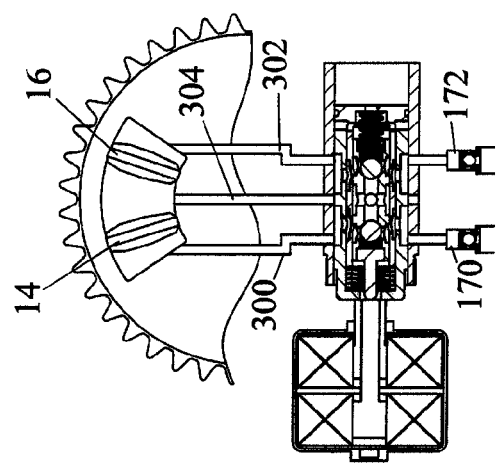
Fig. 9
Fig. 10

VARIABLE PHASE DRIVE COUPLING

CROSS REFERENCE TO RELATED APPLICATION

This application claims priority under 35 USC 119 of United Kingdom Patent Application No. 0524159.1 filed Nov. 28, 2005.

FIELD OF THE INVENTION

The present invention relates to a variable phase drive coupling, also herein termed a phaser, for providing drive from an engine crankshaft to two sets of cams, the drive coupling comprising a drive member connectable for rotation with the engine crankshaft and two driven members each connectable with a respective one of the two sets of cams.

SUMMARY OF THE INVENTION

According to the present invention, there is provided a phaser as set forth above wherein the angular relationship of each of the driven members is independently variable relative to the drive member under the action of camshaft torque reversals.

Preferably, the driven members are hydraulically coupled for rotation with the drive member and the phase of the driven members is controlled by selectively permitting the flow of hydraulic fluid between the hydraulic chambers.

Conventionally, hydraulically operated phasers use an engine generated hydraulic oil pressure in order to alter the timing of the camshafts, but the phaser of the preferred embodiments of the present invention relies instead on the pressure generated by the reaction torque reversals of the cams.

The invention is particularly applicable to engines using an assembled camshaft having two groups of cam lobes mounted on the same shaft, the timing of the two groups of cam lobes being variable in relation to one another. The invention is however alternatively applicable to an engine having one camshaft driven directly from the engine crankshaft and using a secondary drive to operate the second camshaft from the first.

Preferably, the phaser is a 'vane-type' phaser having a number of oil-filled arcuate cavities, each cavity being divided into two parts by a moveable radial vane. Allowing oil to flow from one side of the vane to the other through one-way valves changes the position of the vane in the cavity, thus actuating the phaser.

Advantageously, the flow of the hydraulic fluid is controlled via two spool valves mounted concentrically.

It is possible for each of the driven members to be controlled via two oil passages, each of which is fitted with a one-way valve that may be selectively bypassed.

Alternatively, each of the driven members may be controlled via two oil passages connected to a single one-way valve that controls the direction of flow between the two passages.

In order to achieve a compact implementation, it is desirable to integrate one or more of the one-way valves into a spool valve.

As a further possibility, the two driven members may be controlled via three oil passages, the flow through each of which is controlled via the two spool valves.

BRIEF DESCRIPTION OF THE DRAWINGS

The invention will now be described further, by way of example, with reference to the accompanying drawings, in which:

FIG. 2 is a front view of the phaser of FIG. 1,

FIG. 3 is a longitudinal section through an assembled camshaft fitted with the phaser of FIG. 1 taken in the plane A-A in FIG. 2, FIG. 4 is a detail of FIG. 3 drawn to an enlarged scale, FIG. 5 is an exploded perspective view of the solenoid operated control valve of the phaser in FIG. 1, FIG. 6 is a plan view of cylinder head using two separate camshafts and a having a phaser of the invention to enable the phase of each of the camshafts to be varied independently relative to the crankshaft, and FIGS. 7 to 11 are schematic diagrams showing the design of different hydraulic circuits that may be used for controlling the phaser.

DETAILED DESCRIPTION OF THE PREFERRED EMBODIMENTS

Figure 1:
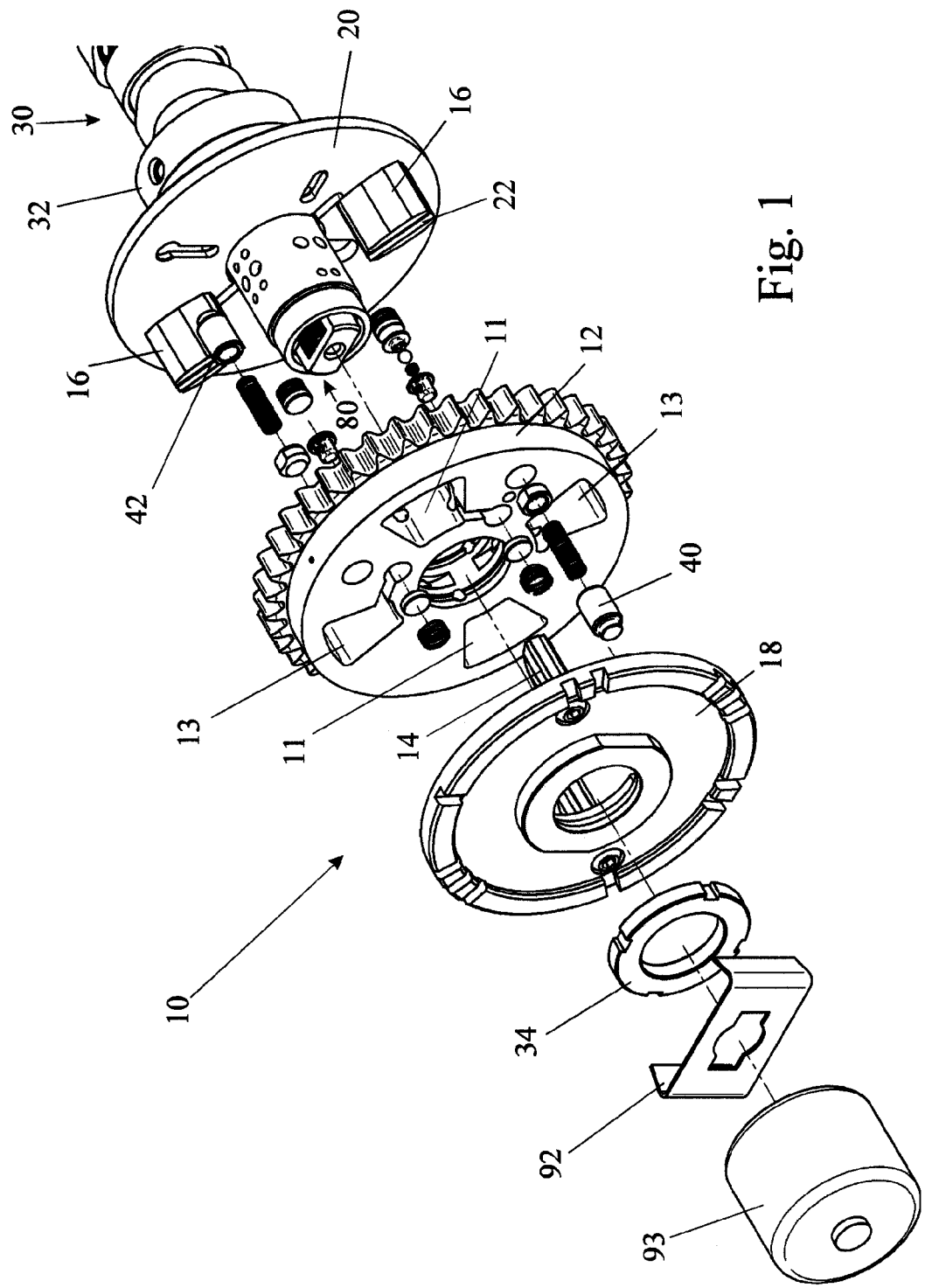
FIG. 1 is an exploded perspective view of a first embodiment of the invention.

The following description will assume a basic understanding of the construction and operation of vane-type phasers which are well documented in the prior art, for example in U.S. Pat. No. 6,725,817.

A phaser 10 shown in FIGS. 1 to 5 has two pairs of cavities 11 and 13 in its drive sprocket 12, one diametrically opposed pair of cavities for each of two phased outputs. Vanes 14 and 16 are fixed to front and rear plates 18 and 20, respectively, of the phaser 10 and are fitted with rubber seals 22 to reduce leakage. The rear plate 20 is integral with the front bearing 32 of an assembled camshaft 30.

The camshaft 30, as shown in FIG. 3, has an inner shaft 50 rotatable relative to an outer tube 52. The outer tube is fast in rotation with one set of cams 54. A second set of cams 56 that are free to rotate about the outer tube is coupled for rotation with the inner shaft 50 by means of pins 58 that pass through tangentially elongated slots in the outer tube 52. Such an assembled camshaft is itself well known and is referred to as an SCP (single cam phaser) camshaft.

The bearing 32 is connected to the inner shaft 50 of the SCP camshaft and drives the cam lobes 56 that can rotate relative to the outer tube of the camshaft. The front plate 18 on the other hand is clamped to the front of the camshaft outer tube 52 via a nut 34 (see FIG. 4) and drives all of the cam lobes 54 fixed to the outer tube 52.

Two locking pins 40 and 42 are provided to prevent the front and rear plates 18, 20 from moving under low oil pressure conditions when the engine is starting or stopping. The locking pins 40 and 42 are disengaged by an oil pressure feed from the camshaft front bearing, as shown in FIG. 4. The oil pressure supply from the front bearing 32 is also used to top-up the oil inside the phaser, to compensate for any leakage, and is connected to the oil circuit inside the phaser by a conventional one-way valve system 60.

Each of the phaser outputs is controlled via two one-way valves 70 and 72, the valves allowing oil to flow into the pair of cavities on opposite sides of their respective vanes, thus allowing the phase of the front/rear plate to be controlled. The flow through the one-way valves 70 and 72 is controlled by a spool valve 80, shown in exploded view in FIG. 5.

The spool valve 80 comprises an inner spool 82 biased by a spring 84 and an outer spool 86 biased by a spring 88. The two spools 82 and 86 are separated by a stationary separator sleeve 90 and a spool retainer 92 engages both the front end of the outer spool 86 and the front plate 18 of the phaser to ensure that the spool valve 80 does not rotate within the outer tube of the camshaft. A solenoid 93 having two separate coils 91, 95 operates two concentric actuators each displacing a respective one of the two spools 82, 86 against the action of its associated spring.

The operation of the spool valve 80 and the one-way valves 70 and 72 will be better understood by referring to the system diagrams in FIGS. 7 and 8.

FIG. 7, which is in three parts shows the operation of the outer spool 86 of the spool valve that is connected to one set of vanes. The three views in each of FIGS. 7 to 10 show different positions of the valve spools and the way in which they affect the flow in the hydraulic circuit and the effect on the phase of the outputs of the phaser.

Oil feeds 100 and 102 are provided in FIG. 7 to both sides of the vane 16, which are each connected via a one-way valve 70, 72 to a connecting oil gallery 104. The one-way valves 70 and 72 are arranged such that oil may flow from the oil gallery 104 to either section of the cavity, but oil cannot flow from the cavity into the oil gallery 104. In its central position, the outer spool 86 blocks the end of both oil feeds 102 and 104 from the cavity 13 and so the vane 16 is unable to move.

Moving the outer spool 86 to the left (see the second view of FIG. 7) will connect the left hand oil feed 100 to the central oil gallery 104, opening a path for oil to flow out of the working chamber on left side of the vane 16 and back into the chamber on the right side of the vane 16 via the one-way valve 72 in the right hand oil feed 102. The phaser can therefore only provide torque in an anti-clockwise direction and any torque from the camshaft in the opposite direction will cause the vane to move in an anti-clockwise direction by pushing oil from one side of the cavity to the other.

Moving the outer spool 86 in the opposite direction as illustrated in the right hand view of FIG. 7 allows the vane 16 to move in a clockwise direction as shown.

The operation of the inner spool 82 is similar in principle to that of the outer spool 86, but it controls the other output of the phaser via a second set of vanes 14. The three views of FIG. 8 illustrate the movement of the inner spool 82 and the associated movement of the vane 14 that will be permitted.

In order to reach the inner spool 82, the oil connections need to pass through slots in the outer spool 86 and the stationary spool separator 90. The slots in the outer spool 86 are designed to ensure that oil flow to the inner spool 82 is not affected by the position of the outer spool.

Both oil circuits are fed with oil from the engine oil pump in order to replace any leakage, and the feed is connected to the central oil galleries via one-way valves. Two separate valves are required in order to prevent any communication between the two control systems.

The orientation of the outer spool 86 needs to be controlled in order to ensure that its slots and its drillings for transferring oil to the inner spool are correctly aligned to the holes in the front of the camshaft tube 52. This is achieved by the spool retainer 92 which both retains the outer spool 86 inside the phaser and prevents it from rotating.

It would be possible to apply the same type of phasing system to an engine having conventional twin camshafts, using a secondary gear or chain connection to drive the second camshaft from the first. Such an embodiment is illustrated in FIG. 6 in which two solid camshafts 200 and 202 are mounted parallel to one another in the engine cylinder head. The camshaft 200 is connected to the front plate of the phaser 204 and instead of driving the inner shaft of an assembled camshaft, the rear plate of the phaser 204 drives a sprocket 206 connected to drive the second camshaft 202.

Figure 11:
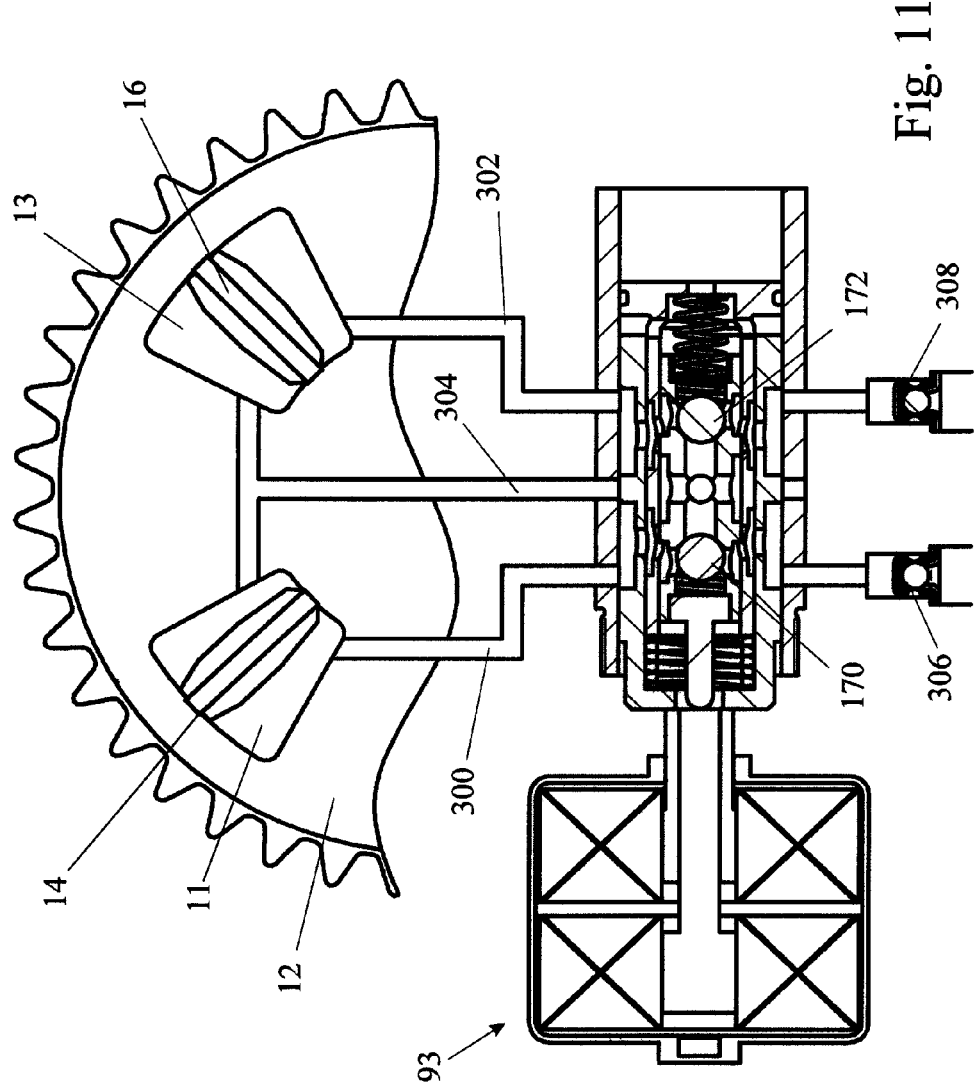

It will be appreciated that the invention is not restricted to the hydraulic circuit described above and that various alternative designs may be adopted, examples of such alternative hydraulic circuits being shown in FIGS. 9 to 11. Most of the components of these circuits operate in analogous manner to that already described and the ensuing description will therefore be restricted to the points of difference.

The embodiment of FIG. 9 uses a single one-way valve 250 to replace the valves 70 and 72 in FIG. 7. The single one-way valve 250 is positioned at the intersection of the central oil gallery 104 with the two oil feeds from the vane cavity. The valve 250 needs to be designed to isolate the two oil feeds from each other when it is closed, hence it has a long parallel section.

The top up oil feed from the engine oil pump is fed into the system through the middle of the one-way valve 250 via a simple ball valve. This arrangement causes the one way valve to be forced onto its seat by the engine oil pressure and the valve will only open when the pressure in the central gallery exceeds the engine oil pressure.

The operation of the system is identical in all other respects as illustrated in FIG. 7. Moving the spool to the left connects the left hand oil feed to the central gallery 104, allowing the vane 16 to push oil out of the left hand side of the cavity and move in an anti-clockwise direction. Moving the spool 86 to the right connects the right hand oil feed to the central gallery, allowing the vane 16 to push oil out of the right hand side of the cavity and move in a clockwise direction.

The embodiments of FIGS. 10 and 11 have one-way valves 170, 172 positioned within the inner valve spool instead of being mounted in the main body of the phaser.

These figures also show how the two phaser outputs may be controlled using three oil feeds 300, 302, 304 rather than four (two each of oil feeds 100 and 102) to control both the outputs of the phaser. The embodiments of FIGS. 10 and 11 operate in essentially the same manner and differ only in that in FIG. 10 the vanes 14 and 16 driving the two outputs share a common cavity whereas in FIG. 11 two separate cavities are used as in the previously described embodiments but two of the chambers of the cavities are directly connected to one another.

In these embodiments, the outer spool is used to determine which of the three feeds is connected to the inner spool. The inner spool is used to control the direction of oil flow between the two oil feed paths that are connected to it. Moving the inner spool to the left allows oil from the left hand feed to flow into the bore of the spool, pass through to the right hand of the bore via a one way valve 170, 172 and out into the right hand feed. Moving the inner spool to the right allows oil from the right hand feed to flow into the bore of the spool, pass through to the left hand end of the bore via the one way valve and out into the left hand oil feed.

Two separate top-up oil feeds 306, 308 from the engine oil supply are shown in FIG. 11 at the bottom of each view.

The left hand view of FIG. 10 shows the outer spool in its central position where the two outer oil feeds are connected to the inner spool and the centre oil feed is blocked. This will allow oil to be transferred between the two outer sections of the cavity whilst the middle section remains the same.

The middle view of FIG. 10 shows the outer spool moved to the left, such that the right hand oil way is blocked and the inner spool is connected to the left hand and central oil ways. This will allow oil to be transferred between the left hand and the central sections of the cavity whilst the right hand section remains the same.

The right hand view of FIG. 10 shows the outer spool moved to the right, such that the left hand oil way is blocked and the inner spool is connected to the central and right hand oil ways. This will allow oil to be transferred between the central and the right hand sections of the cavity whilst the left hand section remains the same.

Intermediate positions of the outer spool will allow all three sections of the cavity to be controlled at the same time. However, there is no position of the outer spool that will allow oil to flow out of the central section and into both outer sections, or allow oil to flow out of both outer sections and into the central section.

The oil feeds can be designed to permit this type of variation if required, but there will be a different flow regime that becomes precluded instead.

The different embodiments of the invention offer the following advantages when compared to existing vane-type phaser designs:

The phaser requires only a 'top up' oil feed, hence reducing oil consumption.

The response speed of the phaser is not dependent upon oil supply pressure.

No complex oil control drillings are required in the cylinder head or block.

No oil drainage problems result from large quantities of 'waste' oil.

The invention claimed is:

1. A variable phase drive coupling for providing drive from an engine crankshaft to two sets of cams, the drive coupling comprising a drive member connectable for rotation with the engine crankshaft and two driven members each connectable with a respective one of the two sets of cams, wherein the angular relationship of each of the driven members is independently variable relative to the drive member under the action of camshaft torque reversals, the driven members are hydraulically coupled for rotation with the drive member, the phase of the driven members is controlled by selectively enabling the flow of hydraulic fluid through one-way valves, and the flow of the hydraulic fluid is controlled by two concentrically mounted spool valves.

2. A variable phase drive coupling as claimed in claim 1, wherein each of the driven members is controlled via two oil passages, each of which is fitted with a one-way valve that may be selectively bypassed.

3. A variable phase drive coupling as claimed in claim 1, wherein each of the driven members is controlled via two oil passages connected to a single one-way valve that controls the direction of flow between the two passages.

4. A variable phase drive coupling as claimed in claim 1, wherein the two driven members are controlled via three oil passages, the flow through each of which is controlled via the two spool valves.

5. A variable phase drive coupling as claimed in claim 1, wherein at least one of the one-way valves is integrated into a spool valve.

6. A variable phase drive coupling as claimed in claim 1, connected to two sets of cams that are rotatable about the same axis as one another, the first set of cams being mounted on an outer tube and the second set of cams being fast in rotation with an inner shaft mounted concentrically within and rotatable relative to the outer tube.

7. A variable phase drive coupling as claimed in claim 1, connected to two sets of cams formed by fixed cams on two separate camshafts, each of which is rotatable with a respective one of the driven members.

8. A variable phase drive coupling as claimed in claim 1, wherein the two concentrically mounted spool valves comprise an inner spool, an outer spool, and two actuators for displacing the two spools respectively.

9. A variable phase drive coupling as claimed in claim 1, wherein the two concentrically mounted spool valves comprise an inner spool biased by a first spring, an outer spool biased by a second spring, and first and second actuators for displacing the inner and outer spools against the action of the first and second springs respectively.

* * * * *